(12) United States Patent
Smith et al.

(10) Patent No.: US 12,085,043 B1
(45) Date of Patent: Sep. 10, 2024

(54) AIRCRAFT PROPULSION SYSTEM WITH TURBINE ENGINE AND EXHAUST CONDENSER

(71) Applicant: Pratt & Whitney Canada Corp., Longueuil (CA)

(72) Inventors: Scott Smith, St-Lambert (CA); Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/211,105

(22) Filed: Jun. 16, 2023

(51) Int. Cl.
   *F02K 1/82* (2006.01)
   *B64D 33/04* (2006.01)
   *F01D 25/32* (2006.01)

(52) U.S. Cl.
   CPC ............. *F02K 1/822* (2013.01); *B64D 33/04* (2013.01); *F01D 25/32* (2013.01); *F05D 2220/323* (2013.01)

(58) Field of Classification Search
   CPC .......... B64D 33/04; F02K 1/822; F01D 25/32
   See application file for complete search history.

(56) References Cited

U.S. PATENT DOCUMENTS

| | | | |
|---|---|---|---|
| 3,028,124 A | 4/1962 | Sammons | |
| 3,228,464 A * | 1/1966 | Stein | F28F 3/046 165/166 |
| 4,312,480 A * | 1/1982 | Miller | F02K 1/825 239/265.17 |
| 2022/0268178 A1 | 8/2022 | Nakatani | |

* cited by examiner

*Primary Examiner* — Andrew H Nguyen
(74) *Attorney, Agent, or Firm* — Getz Balich LLC

(57) ABSTRACT

An aircraft propulsion system is provided that includes a turbine engine and an exhaust gas condenser. The exhaust gas condenser includes a housing, a nozzle, a plurality of air scoops, and a plurality of exhaust gas conduit banks. The housing has an interior cavity, a bottom side, and first and second lateral sides. The exhaust gas conduit banks are disposed in the interior cavity of the housing and are configured to form an interior bypass air chamber. Each exhaust gas conduit bank includes alternating exhaust gas conduits and bypass air passages. The exhaust gas conduits extend axially between the forward and aft ends, and are configured to conduct exhaust gases to the nozzle. The bypass air passages are configured to receive bypass air from the air scoops and direct the bypass air between the exhaust gas conduits and into the interior bypass air chamber.

19 Claims, 6 Drawing Sheets

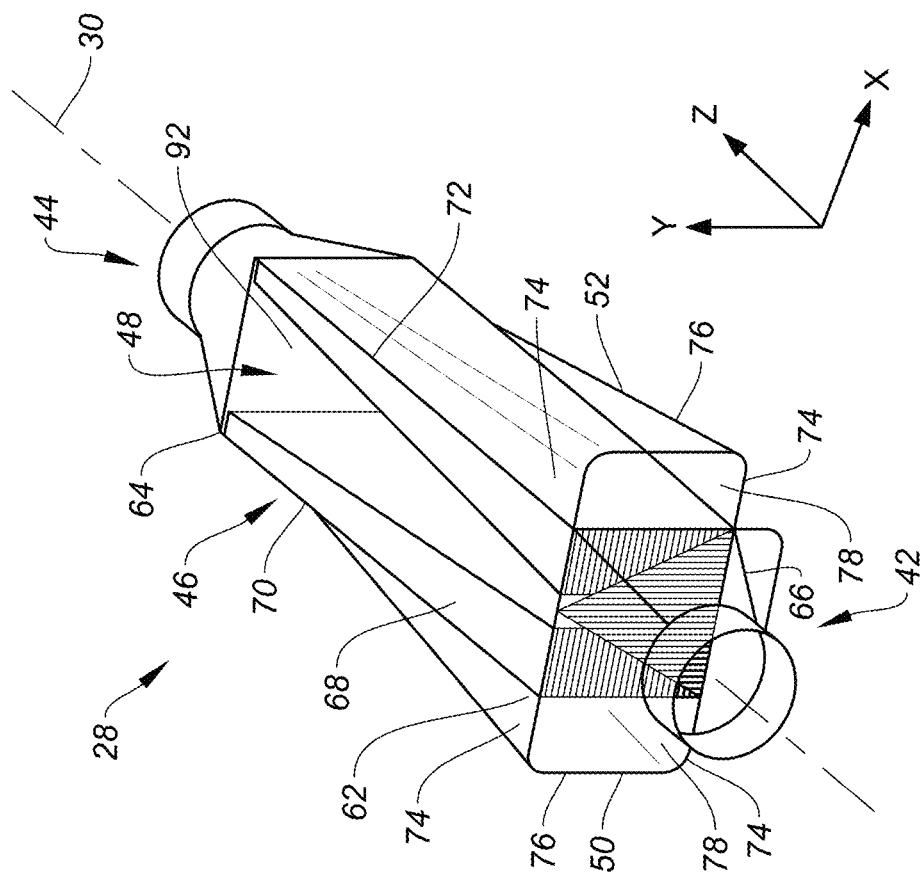
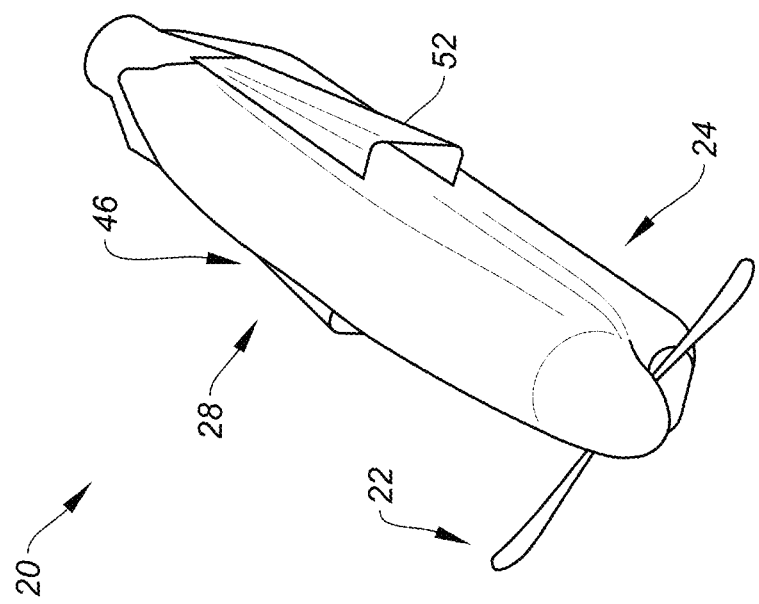
FIG. 3
FIG. 2

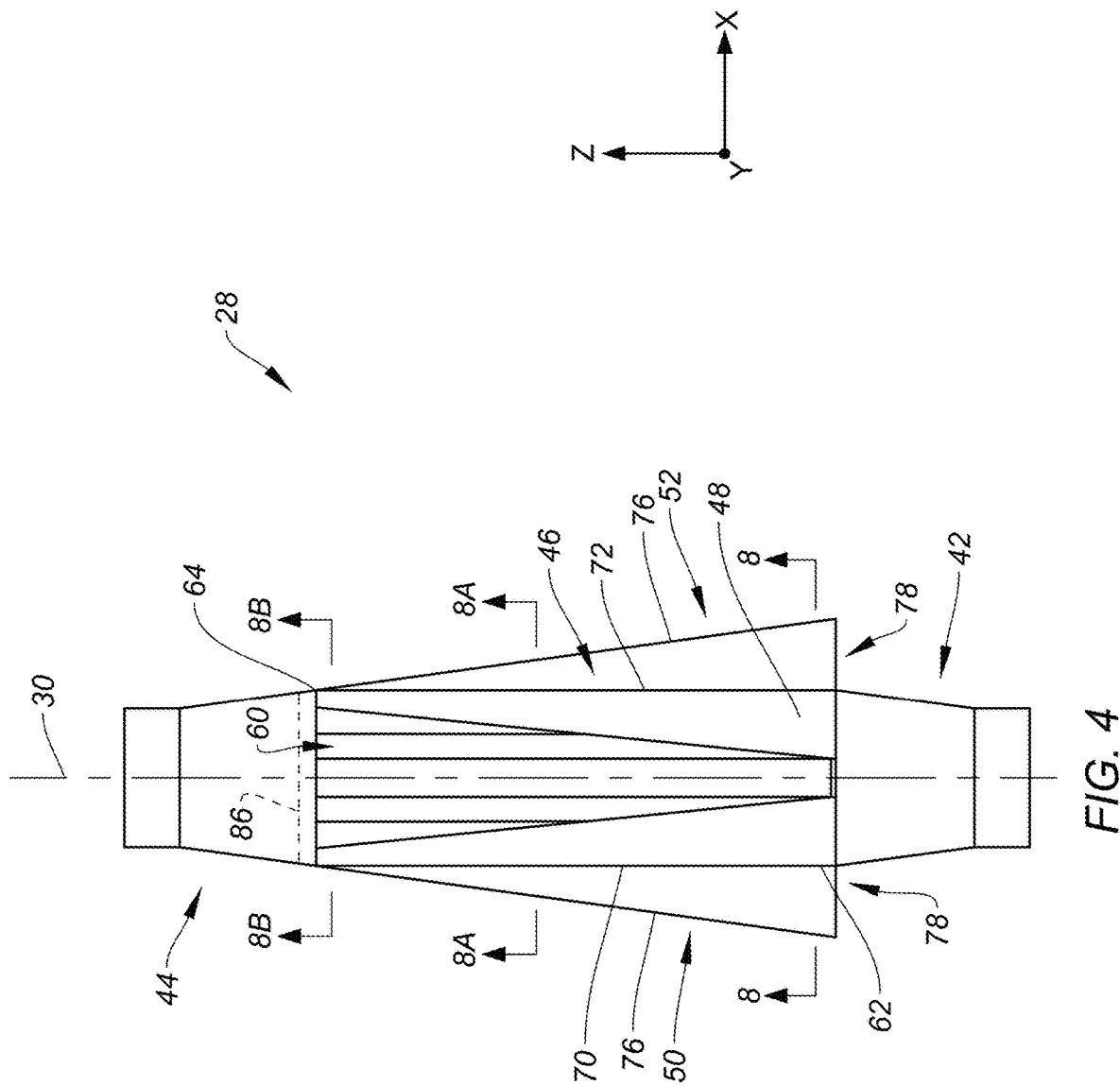

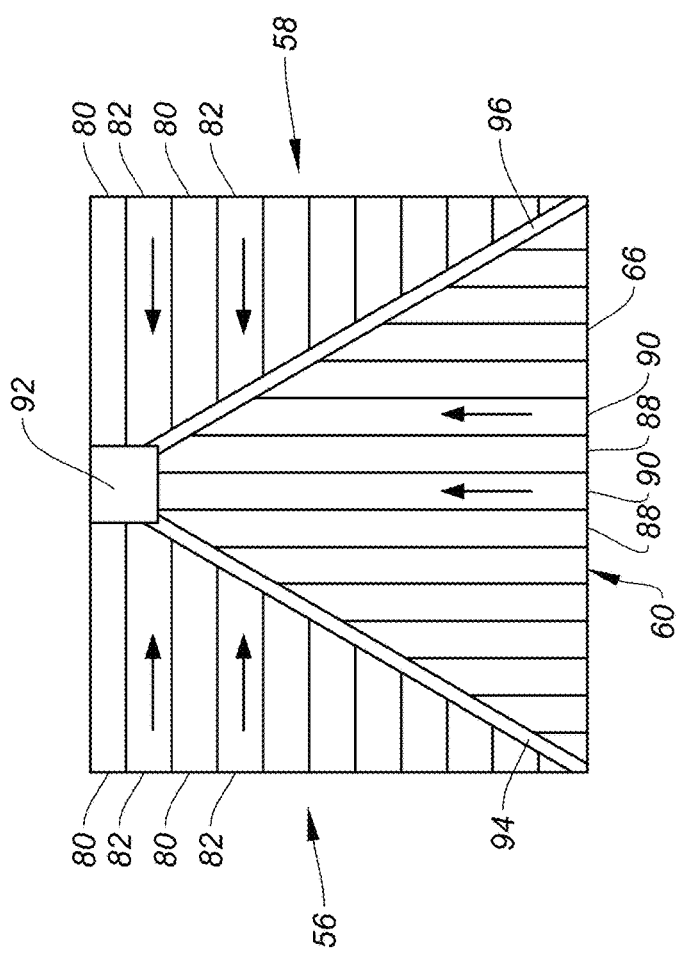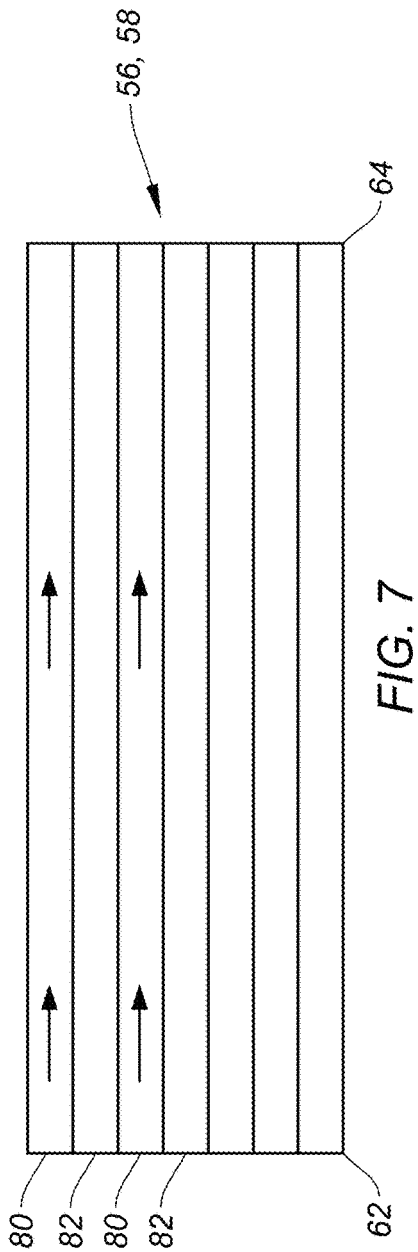

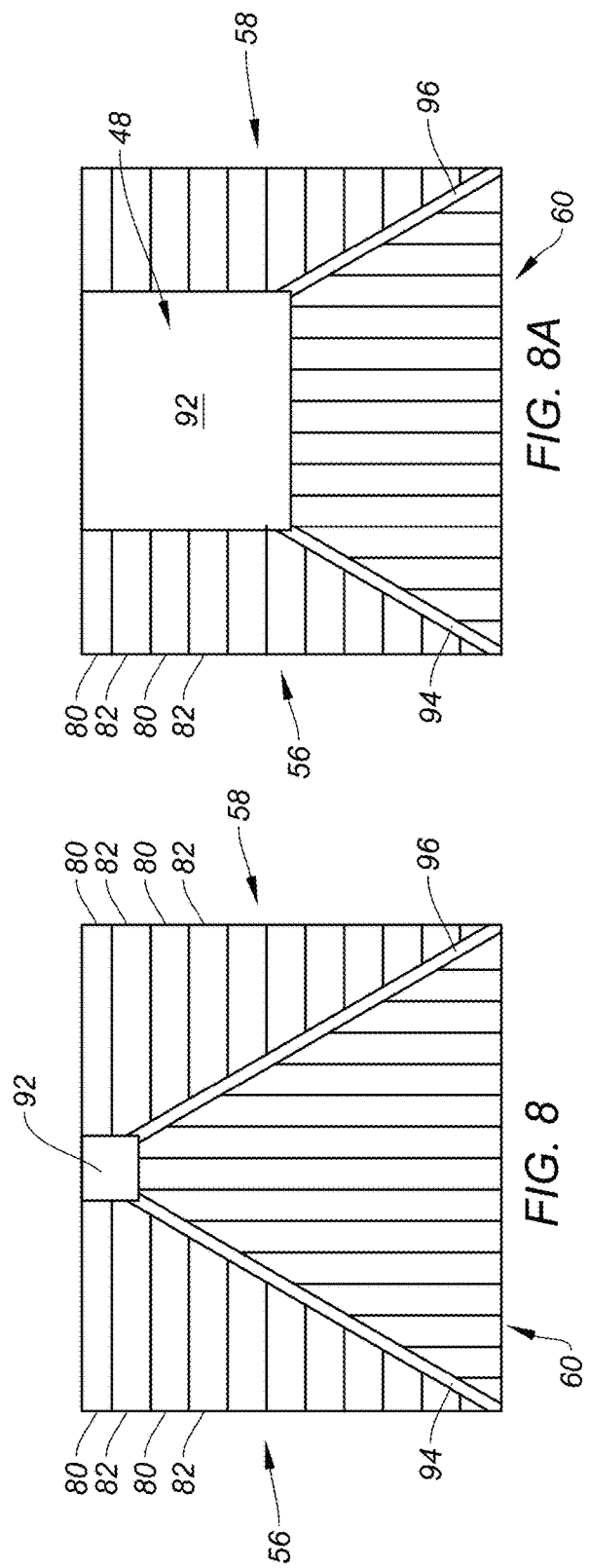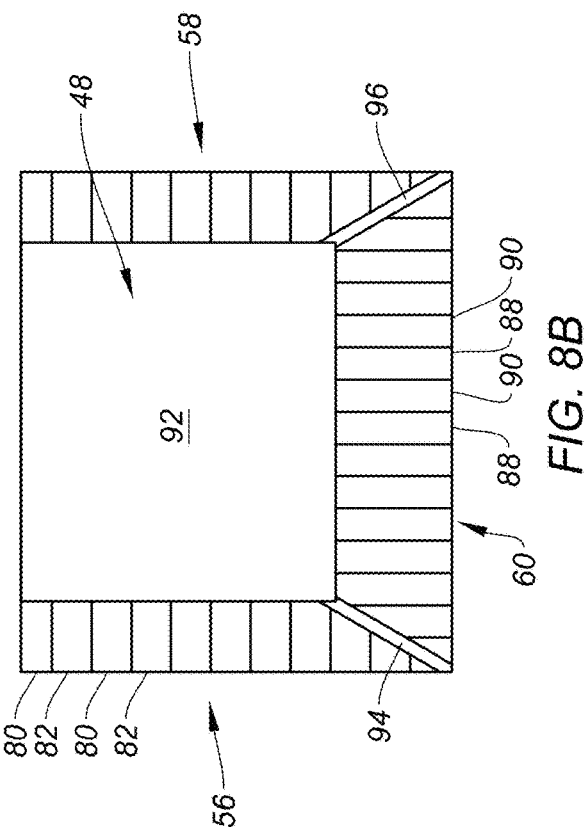

AIRCRAFT PROPULSION SYSTEM WITH TURBINE ENGINE AND EXHAUST CONDENSER

BACKGROUND OF THE INVENTION

1. Technical Field

This disclosure relates to an aircraft in general, and to a turbine engine system for an aircraft in particular.

2. Background Information

There is interest in alternative fuels for gas turbine engines. There is interest, for example, in fueling a gas turbine engine with a non-hydrocarbon fuel (e.g., hydrogen) rather than a traditional hydrocarbon fuel such as kerosine to reduce greenhouse emissions. Various systems and methods are known in the art for fueling a gas turbine engine with hydrogen. While these known systems and methods have various advantages, there is still room in the art for improvement.

SUMMARY

According to an aspect of the present disclosure, an aircraft propulsion system is provided that includes a turbine engine and an exhaust gas condenser. The turbine engine is configured to exhaust gases during combustion of a fuel, wherein the exhaust gases include water vapor. The exhaust gas condenser extends lengthwise along a central axis and includes a housing, a nozzle, a plurality of air scoops, and a plurality of exhaust gas conduit banks. The housing extends lengthwise between a forward end and an aft end. The housing has an interior cavity, a top side, a bottom side opposite the top side, a first lateral side, and a second lateral side opposite the first lateral side. The first and second lateral sides extend between the top side and the bottom side. The nozzle is in communication with the housing and is disposed at the aft end. The air scoops are attached to the housing. The exhaust gas conduit banks are disposed in the interior cavity of the housing. The exhaust gas conduit banks are configured to form an interior bypass air chamber within the housing interior cavity. Each exhaust gas conduit bank includes a plurality of exhaust gas conduits and a plurality of bypass air passages. The exhaust gas conduits and the bypass air passages are disposed relative to one another in an alternating configuration. The exhaust gas conduits extend axially between the forward end and the aft end, and are open at the forward end to receive the exhaust gases from the turbine engine and are open at the nozzle. The bypass air passages are configured to receive bypass air from the plurality of air scoops and direct the bypass air between the exhaust gas conduits and into the interior bypass air chamber. The interior bypass air chamber is in fluid communication with the nozzle.

In any of the aspects or embodiments described above and herein, the exhaust gas condenser may be configured to keep the exhaust gases separate from the bypass air.

In any of the aspects or embodiments described above and herein, the nozzle may include an exhaust gas portion and a bypass air portion, and the exhaust gas conduits may be in communication with the exhaust gas portion of the nozzle and the exhaust gas nozzle portion may be configured to maintain the exhaust gases separate from the bypass air, and the interior bypass air chamber may be in communication with the bypass air portion of the nozzle and the bypass air portion may be configured to maintain the bypass air separate from the exhaust gases.

In any of the aspects or embodiments described above and herein, the plurality of exhaust gas conduit banks may include a first lateral side bank of exhaust gas conduits disposed adjacent to the first lateral side of the housing, a second lateral side bank of exhaust gas conduits disposed adjacent to the second lateral side of the housing, and a bottom side bank of exhaust gas conduits disposed adjacent to the bottom side of the housing, and the plurality of air scoops may include a first lateral side air scoop attached to the first lateral side of the housing, a second lateral side air scoop attached to the second lateral side of the housing, and a bottom side air scoop attached to the bottom side of the housing.

In any of the aspects or embodiments described above and herein, the exhaust gas conduits within the first lateral side bank of exhaust gas conduits and the second lateral side bank of exhaust gas conduits may be lateral side (LS) exhaust gas conduits and the bypass air passages disposed alternating with the LS exhaust gas conduits may be LS bypass air passages, and the LS exhaust gas conduits may extend laterally, and the LS bypass air passages of the first lateral side bank of exhaust gas conduits may be configured to provide fluid communication between the first lateral side air scoop and the interior bypass air chamber, and the LS bypass air passages of the second lateral side bank of exhaust gas conduits may be configured to provide fluid communication between the second lateral side air scoop and the interior bypass air chamber.

In any of the aspects or embodiments described above and herein, the exhaust gas conduits within the bottom side bank of exhaust gas conduits may be bottom side (BS) exhaust gas conduits and the bypass air passages disposed alternating with the BS exhaust gas conduits may be BS bypass air passages, and the BS exhaust gas conduits may extend heightwise, and the BS bypass air passages of the bottom side bank of exhaust gas conduits may be configured to provide fluid communication between the bottom side air scoop and the interior bypass air chamber.

In any of the aspects or embodiments described above and herein, the exhaust gas condenser may further include a first collection channel and a second collection channel. The first collection channel may be disposed at a first interface between the first lateral side bank of exhaust gas conduits and the bottom side bank of exhaust gas conduits, wherein the first collection channel may be configured to receive bypass air from at least some of the LS bypass air passages within the first lateral side bank of exhaust gas conduits and direct the bypass air to the interior bypass air chamber. The second collection channel may be disposed at a second interface between the second lateral side bank of exhaust gas conduits and the bottom side bank of exhaust gas conduits, and the second collection channel may be configured to receive bypass air from at least some of the LS bypass air passages within the second lateral side bank of exhaust gas conduits and direct the bypass air to the interior bypass air chamber.

In any of the aspects or embodiments described above and herein, a flow area of the interior bypass chamber may increase in the axial direction from the forward end to the aft end.

In any of the aspects or embodiments described above and herein, the housing has a length, a width, and a height, and the first and second lateral side air scoops may each have an opening disposed at the forward end, and each of the first and second lateral side air scoops may taper inwardly in a direction from the forward end to the aft end.

In any of the aspects or embodiments described above and herein, the first and lateral side air scoop and the second lateral side air scoop extend the length of the housing.

In any of the aspects or embodiments described above and herein, the first and second lateral side air scoops may extend the height of the housing.

In any of the aspects or embodiments described above and herein, the housing has a length, a width, and a height, and the bottom side air scoop may have an opening disposed at the forward end, and the bottom side air scoop may taper inwardly in a direction from the forward end to the aft end.

In any of the aspects or embodiments described above and herein, the bottom side air scoop may extend the length of the housing.

In any of the aspects or embodiments described above and herein, the bottom side air scoop may extend the width of the housing.

In any of the aspects or embodiments described above and herein, the system may include a water recovery system in communication with the exhaust gas condenser, the water recovery system configured to recover liquid water from the exhaust gas condenser.

According to an aspect of the present disclosure, an exhaust gas condenser for an aircraft turbine engine is provided that extends lengthwise along a central axis. The exhaust gas condenser includes a housing, a nozzle, a plurality of air scoops, and a plurality of exhaust gas conduit banks. The housing is configured to receive exhaust gases from an aircraft turbine engine. The housing extends lengthwise between a forward end and an aft end, and has an interior cavity, a top side, a bottom side opposite the top side, a first lateral side, and a second lateral side opposite the first lateral side. The first and second lateral sides extend between the top and bottom sides. The nozzle is in communication with the housing and disposed at the aft end. The plurality of air scoops are attached to the housing. The exhaust gas conduit banks are disposed in the interior cavity of the housing. The exhaust gas conduit banks are configured to form an interior bypass air chamber within the housing interior cavity. Each exhaust gas conduit bank includes a plurality of exhaust gas conduits and a plurality of bypass air passages. The exhaust gas conduits and the bypass air passages are disposed relative to one another in an alternating configuration. The exhaust gas conduits extend axially between the forward end and the aft end, and are open at the forward end to receive the exhaust gases from the turbine engine and are open at the nozzle. The bypass air passages are configured to receive bypass air from the plurality of air scoops and direct the bypass air between the exhaust gas conduits and into the interior bypass air chamber. The interior bypass air chamber is in fluid communication with the nozzle.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

FIG. 2 is a diagrammatic perspective view of a present disclosure propulsion system.

FIG. 3 is a diagrammatic perspective view of a present disclosure exhaust gas condenser embodiment.

FIG. 4 is a diagrammatic top view of a present disclosure exhaust gas condenser embodiment.

FIG. 6 is a diagrammatic end view of an embodiment of banks of exhaust gas conduits and bypass air passages.

FIG. 7 is a diagrammatic side view of an embodiment of a bank of exhaust gas conduits and bypass air passages.

FIGS. 8-8B are diagrammatic views of an embodiment of banks of exhaust gas conduits and bypass air passages at different axial positions.

DETAILED DESCRIPTION

Figure 1:
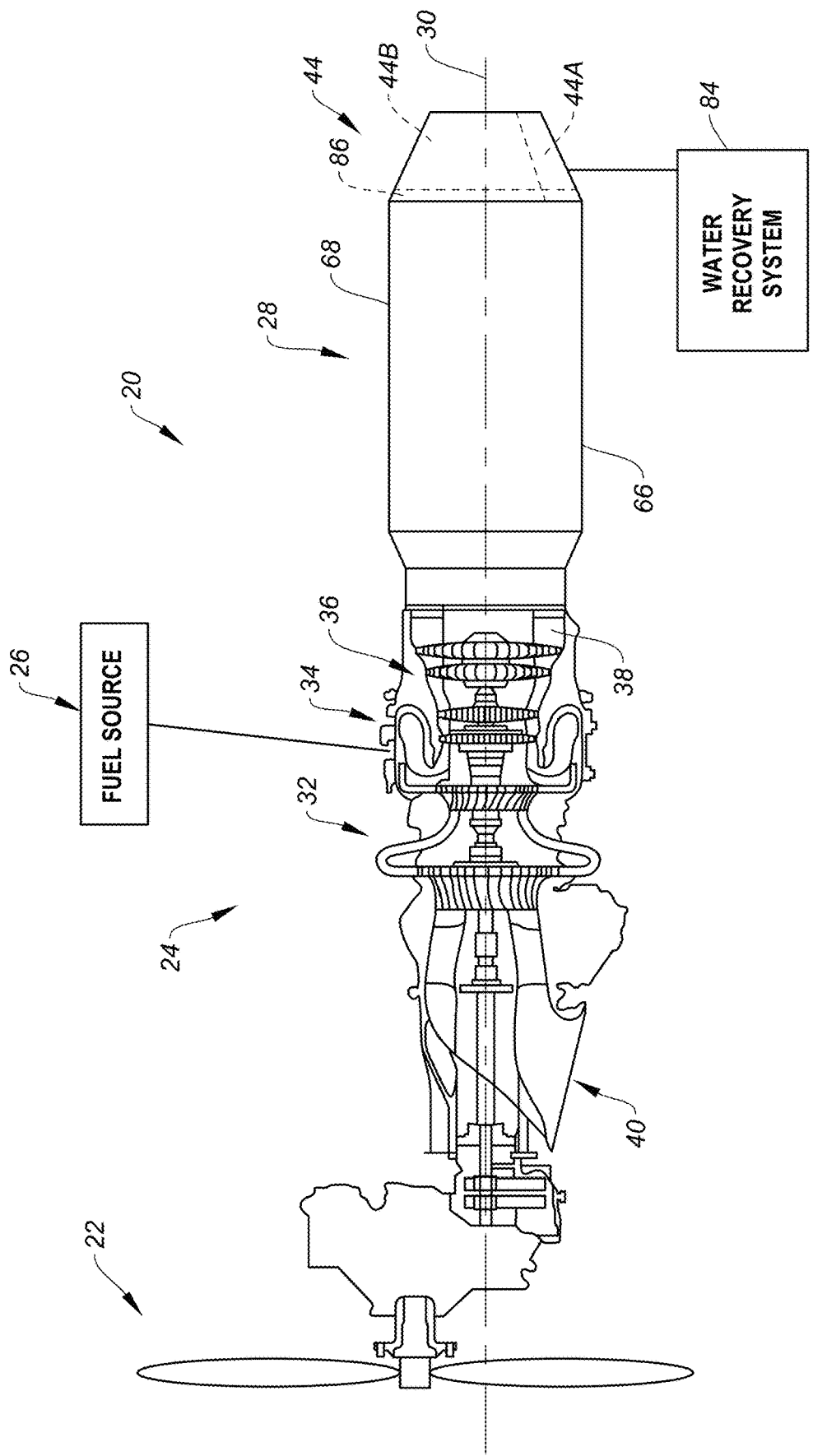
FIG. 1 is a diagrammatic partially sectioned view of a present disclosure propulsion system.

FIG. 1 diagrammatically illustrates a propulsion system 20 for an aircraft. The aircraft may be an airplane, a helicopter, a drone (e.g., an unmanned aerial vehicle (UAV)) or any other manned or unmanned aerial vehicle or system. The propulsion system 20 shown in FIG. 1 includes a propulsor rotor 22, a turbine engine 24, a fuel source 26, and an exhaust gas condenser 28. Non-limiting examples of a propulsor rotor 22 include a propeller rotor for a turboprop propulsion system, a rotorcraft rotor (e.g., a main helicopter rotor) for a turboshaft propulsion system, a propfan rotor for a propfan propulsion system, a pusher fan rotor for a pusher fan propulsion system, a fan for a turbofan propulsion system, or the like. Unless otherwise stated herein, the present disclosure is not limited to any particular turbine engine 24 configuration, or any propulsor rotor 22 configuration.

The turbine engine 24 extends axially along an axis 30 between an upstream, forward end and a downstream, aft end. The turbine engine 24 includes a compressor section 32, a combustor section 34, and a turbine section 36. A core flow path 38 extends sequentially through the compressor section 32, the combustor section 34, and the turbine section 36. Air enters the turbine engine 24 through an airflow inlet 40 upstream of the compressor section 32, passes through the core flow path 38, and exits the turbine engine 24. Thereafter, the core gas enters the exhaust gas condenser 28. As indicated above, the present disclosure is not limited to any particular turbine engine 24 configuration and the aforesaid description of the core flow path 38 and engine component positioning is for illustration purposes and is not intended to be limiting.

Embodiments of the present disclosure propulsion system 20 may include a turbine engine 24 configured to combust non-hydrocarbon fuels (e.g., hydrogen or "$H_2$"), or hydrocarbon fuels (e.g., aviation fuel), or some mixture thereof. For example, the turbine engine 24 within a present disclosure system embodiment may be configured to combust a fuel that is 100% non-hydrocarbon (e.g., 100% $H_2$), or a fuel that is 100% hydrocarbon (e.g., 100% aviation fuel), or a mixture thereof (e.g., a mixture of $H_2$ and aviation fuel). The present disclosure is not limited to any combusting any particular fuel. In those embodiments wherein the present disclosure system 20 combusts hydrogen, the fuel source 26 may be configured to store the hydrogen in liquid form and the present disclosure system 20 may be configured to process the hydrogen to a form (e.g., phase change to a gaseous phase) acceptable for combustion.

The combustion products generated by the combustion of the fuel-air mixture within the combustor section 34 include water ($H_2O$) vapor. The water vapor may be a product of the combustion of a non-hydrocarbon fuel, or the product of water injected into the engine that is vaporized during operation, or any combination thereof. As will be detailed herein, the exhaust gas condenser 28 portion of the present disclosure system 20 is configured to recover at least some of the water vapor produced by the combustion of the fuel-air mixture within the combustor section 34.

Figure 5:
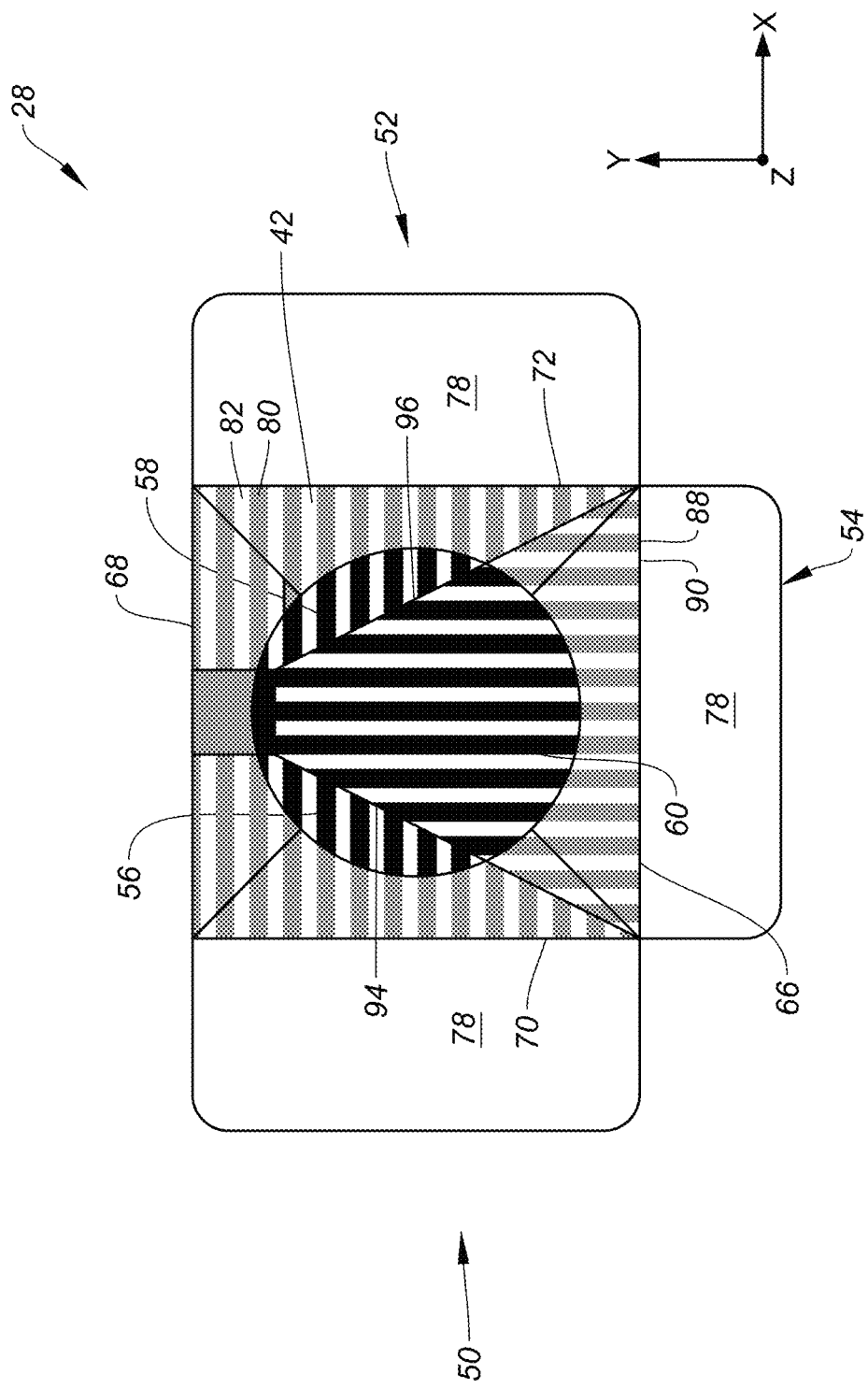
FIG. 5 is a diagrammatic end view of a present disclosure exhaust gas condenser embodiment.

FIG. 2 diagrammatically illustrates a present disclosure aircraft propulsion system 20 with a turbine engine 24 enclosed within a housing that is disposed forward of an aircraft exhaust gas condenser 28. FIG. 3 is a diagrammatic perspective view representation of a present disclosure exhaust gas condenser 28. FIG. 4 is a diagrammatic top view representation of a present disclosure exhaust gas condenser 28. FIG. 5 is a diagrammatic end view perspective representation of a present disclosure exhaust gas condenser 28, wherein the view is in the direction forward to aft.

Referring to FIGS. 3-5, the exhaust gas condenser 28 extends along a central axis 30 (e.g., coincident with the engine axis 30) between an exhaust gas inlet 42 and a nozzle 44. The exhaust gas condenser 28 includes a housing 46, an interior cavity 48, a first lateral side air scoop 50, a second lateral side air scoop 52, a bottom side air scoop 54, a first lateral side bank of exhaust gas conduits 56, a second lateral side bank of exhaust gas conduits 58, and a bottom side bank of exhaust gas conduits 60. The exhaust gas inlet 42 is disposed at a forward end 62 of the housing 46 and the nozzle 44 is disposed at an aft end 64 of the housing 46.

In the embodiment shown in FIGS. 3-5, the exhaust gas condenser housing 46 has a generally rectangular configuration having a width (X-axis), a height (Y-axis), and a length (Z-axis). The cross-section geometry of the condenser housing 46 (e.g., in the X-Y plane) is generally square. In this configuration, the condenser housing 46 may be described as having a bottom side 66 and a top side 68 opposite one another, and a first lateral side 70 and a second lateral side 72 opposite one another. The interior cavity 48 is defined by the bottom, top, first lateral, and second lateral sides 66, 68, 70, 72. The housing 46 includes a top side panel that extends lengthwise between the forward and aft ends 62, 64, and widthwise between the first and second lateral sides 70, 72. In some embodiments, the condenser housing 46 may include lateral side panels that allow bypass air passage therethrough (e.g., via one or more apertures) and that provide structural support. In similar fashion, the condenser housing 46 may include a bottom side panel that allows bypass air passage therethrough (e.g., via one or more apertures) and that provides structural support. The condenser housing 46 does not require lateral side panels or a bottom side panel.

In the embodiment shown in FIGS. 3 and 4, the first and second lateral side air scoops 50, 52 and the bottom side air scoop 54 each extend lengthwise for substantially the entire length of the condenser housing 46. FIGS. 3-5 show first and second lateral side air scoops 50, 52 and a bottom side air scoop 54 each having a generally rectangular cross-sectional configuration, defined by a pair of side panels 74 and an outer panel 76. The present disclosure is not limited to air scoops 50, 52, 54 with a rectangular configuration; e.g., the air scoops 50, 52, 54 may be arcuately shaped. The first and second lateral side air scoops 50, 52 and the bottom side air scoop 54 each include an opening 78 disposed at the forward end 62 of the condenser housing 46. The opening 78 may be defined by a plane that extends between the housing 46 (e.g., a lateral side 70, 72 of the housing 46 for a respective lateral side air scoop 50, 52 or the bottom side 66 of the housing 46 for the bottom side air scoop 54) and the side and outer panel 74, 76 of the respective air scoop 50, 52, 54; e.g., the planes are disposed in the X-Y plane. The present disclosure is not limited to the aforesaid scoop opening 78 orientation. Each of the first and second lateral side air scoops 50, 52 and the bottom side air scoop 54 taper inwardly toward the central axis 30 of the condenser 28 in the direction from forward to aft. In this manner, the cross-sectional flow area of the scoops 50, 52, 54 decrease in the direction from forward to aft. In the embodiment shown in FIGS. 3-5, the outer panel 76 of the respective air scoops 50, 52, 54 is shown extending linearly in the direction from forward to aft. Alternatively, the outer panel 76 of the respective air scoops 50, 52, 54 may taper inwardly along an arcuate line. As stated above, in the embodiment shown in FIGS. 3 and 4 the first and second lateral side air scoops 50, 52 and the bottom side air scoop 54 each extend lengthwise for substantially the entire length of the condenser housing 46 and are shown enclosing the entire respective side of the condenser housing 46. The present disclosure is not limited to this embodiment. For example, one or more of the first and second lateral side air scoops 50, 52 and the bottom side air scoop 54 may extend lengthwise for less than the entire length of the condenser housing 46 and/or may enclose less that the entire respective side of the condenser housing 46.

Each bank of exhaust gas conduits 56, 58, 60 is disposed within the interior cavity 48 of the condenser housing 46. The first and second lateral side (LS) banks of exhaust gas conduits 56, 58 include a plurality of planar LS exhaust gas conduits 80 that extend axially (e.g., along the Z-axis; see FIGS. 6 and 7) between the forward and aft ends 62, 64 of the housing 46, and laterally within the housing 46 between the housing lateral sides 70, 72. The LS exhaust gas conduits 80 are open at the forward end 62 to receive turbine engine exhaust gas. At the aft end, the LS exhaust gas conduits 80 are in fluid communication with a manifold 86 that directs the exhaust gas to an exhaust gas portion 44A of the nozzle 44. As will be detailed herein, the manifold 86 is in communication with a water recovery system 84.

The LS exhaust gas conduits 80 are spaced apart from one another such that a passage (e.g., an "LS bypass air passage 82" as will be described below) is disposed between each adjacent pair of LS exhaust gas conduits 80. The LS exhaust gas conduits 80 are closed and thereby provide an enclosed passage for exhaust gas axially between the forward and aft ends of the condenser 28. As will be detailed herein, the closed LS exhaust gas conduits 80 keep the exhaust gas separate from (i.e., fluidly isolated from) bypass air traveling through the LS bypass air passages 82 disposed between adjacent LS exhaust gas conduits 80. The bottom side (BS) bank of exhaust gas conduits 60 includes a plurality of planar BS exhaust gas conduits 88 that extend axially (e.g., along the Z-axis) between the forward and aft ends 62, 64 of the housing 46, and heightwise (along the Y-axis) within the housing 46 between the housing bottom and top sides 66, 68. The BS exhaust gas conduits 88 are spaced apart from one another such that a passage (e.g., a "BS bypass air passage 90" as will be described below) is disposed between each adjacent pair of BS exhaust gas conduits 88. The BS exhaust gas conduits 88 are closed and thereby provide an enclosed passage for exhaust gas axially between the forward and aft ends of the condenser 46. As will be detailed herein, the closed BS exhaust gas conduits 88 keep the exhaust gas separate from (i.e., fluidly isolated from) bypass air traveling through the BS bypass air passages 90 disposed between adjacent BS exhaust gas conduits 88. FIG. 6 is a diagrammatic end view showing the LS exhaust gas passages 80, the LS bypass air passages 82, the BS exhaust gas passages 88, and the BS bypass air passages 90 disposed relative to one another in alternating fashion. FIG. 7 is a diagrammatic side view showing the LS exhaust gas passages 80 and the LS bypass air passages 82 extending axially, disposed relative to one another.

The first and second lateral side banks of exhaust gas conduits 56, 58 and the bottom side bank of exhaust gas conduits 60 have tapered configurations that collectively define an interior bypass air chamber 92. A first collection channel 94 is disposed at the interface between the first lateral side (LS) bank of exhaust gas conduits 56 and the bottom side (BS) bank of exhaust gas conduits 60 and a second collection channel 96 is disposed at the interface between the second lateral side (LS) bank of exhaust gas conduits 58 and the bottom side (BS) bank of exhaust gas conduits 60. The first and second collection channels 94, 96 are configured to receive bypass air from respective LS bypass air passages 82 and BS bypass air passages 90 and direct that air into the interior bypass air chamber 92. FIGS. 8-8B are diagrammatic sections at different axial positions of the condenser 46 (see FIG. 4) to illustrate the tapered configurations of the first and second lateral side (LS) banks of exhaust gas conduits 56, 58 and the bottom side (BS) bank of exhaust gas conduits 60 and the corresponding increasingly larger interior bypass air chamber 92. It should be noted that the forward end of the condenser 46 is configured to block turbine engine exhaust gas from entering the interior bypass air chamber 92. The increasingly larger interior bypass air chamber 92 may be described as the axial flow area of the interior bypass air chamber 92 increasing in the axial direction from forward to aft. FIG. 4 diagrammatically illustrates the positions where the diagrammatic sections of FIGS. 8-8B may be axially positioned. The diagrammatic section of FIG. 8 is at an axial position adjacent to the forward end 62 of the housing 46. The diagrammatic section of FIG. 8A is at an axial position in the middle region of the housing 46. The diagrammatic section of FIG. 8B is at an axial position adjacent to the aft end 64 of the housing 46. The interior bypass air chamber 92 is in communication with a bypass air portion 44B of the nozzle 44. FIGS. 5-8B diagrammatically illustrate the exhaust conduits 80 of the first and second lateral side banks 56, 58 and exhaust conduits 88 of the bottom side bank 60 as extending along straight lines (e.g., straight lines along the orthogonal axes X, Y, and Z). The present disclosure is not limited to these configurations (e.g., portions of the exhaust conduits 80, 88 may extend arcuately and therefore not coincident with respective orthogonal axes) and may be modified according to specific applications.

As stated above, the combustion products generated by the combustion of the fuel-air mixture within the combustor section 34 of the turbine engine 24 may include water ($H_2O$) vapor and/or water vapor may be present as a result of water injection. The exhaust gas condenser 28 is configured to utilize bypass air to cool the exhaust gas to a degree that causes at least some of the water vapor in the exhaust gas to change from a gaseous phase to a liquid phase. The liquid water is subsequently recovered and may be used for a variety of different purposes, including injection into turbine engine 24 sections including the compressor section 32, the combustor section 34, and the turbine section 36, and/or for use in the aircraft cabin. Various uses for water (in liquid or gaseous form) in a turbine engine 24 or aircraft are known in the art, and the present disclosure is not limited to any particular one thereof.

During operation of the present disclosure aircraft propulsion system 20, the turbine engine 24 is operated to combust a fuel/air mixture to produce power. The produced exhaust gases exit the turbine section 36 and are directed into the exhaust gas inlet 42 of the exhaust gas condenser 28. Some amount of the exhaust gas is received within the LS exhaust gas conduits 80 within the first and second lateral side banks of exhaust gas conduits 56, 58, and some amount of the exhaust gas is received within the BS exhaust gas conduits 88 within the bottom side bank of exhaust gas conduits 60. The exhaust gases subsequently travel axially through the respective exhaust gas conduits 80, 88 and enter the manifold 86 disposed at the aft end of the condenser 46. While the aircraft is underway, the ambient air is captured by the lateral side air scoops 50, 52 and the bottom side air scoop 54 and is directed into the condenser 28. The temperature of the ambient air is appreciably lower than the temperature of the exhaust gases and is used within the condenser 28 as a cooling medium. The ambient air entering the air scoops 50, 52, 54 (which may be categorized as "ram air" when the aircraft is underway) in an axial direction is directed by the tapered air scoops 50, 52, 54 inwardly where it enters the LS bypass air passages 82 disposed between adjacent LS exhaust gas conduits 80, and the BS bypass air passages 90 disposed between adjacent BS exhaust gas conduits 88. In some embodiments, the condenser 46 may include features (e.g., ribs or the like) to facilitate air direction through the bypass air passages 82, 90. In some embodiments, the condenser 46 may include heat transfer features (e.g., pins, fins, or the like) extending into the bypass air passages 82, 90 and/or the exhaust gas conduits 80, 88 to facilitate heat transfer between the bypass air and the exhaust gases. As the bypass air passes through the LS bypass air passages 82 and BS bypass air passages 90, the bypass air cools the LS exhaust gas conduits 80 and the BS exhaust gas conduits 88 prior to entering the interior bypass air chamber 92. The cooling of the LS exhaust gas conduits 82 and the BS exhaust gas conduits 90, in turn, causes the LS exhaust gas conduits 80 and the BS exhaust gas conduits 90 to cool the exhaust gases traveling axially therethrough. The exhaust gases are cooled sufficiently to cause at least some of the water vapor in the exhaust gases to change from a gaseous phase to a liquid phase. After the bypass air has passed through the LS bypass air passages 82 and BS bypass air passages 90 and passed through the interior bypass air chamber 92, the bypass air enters and exits the bypass air portion 44B of the nozzle 44. During portions of the aircraft flight, the bypass air exiting the bypass air portion 44B of the nozzle 44 may produce propulsive thrust for the aircraft. The exhaust gases entering the manifold 86 disposed at the aft end of the condenser 46 will include some amount of liquid water as a result of the cooling. The manifold 86 may be in communication with a water recovery system 84 (e.g., that may include a pump, filters, valves, and the like) that directs the recovered water for use elsewhere as detailed herein.

The present disclosure aircraft propulsion system 20 described herein having an exhaust gas condenser 28 with lateral side air scoops 50, 52 and a bottom side air scoop 54 is configured for convenient placement under the wing of an aircraft.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details. For example, the present disclosure is described herein as having an exhaust gas condenser 28 that includes exhaust gas conduits and bypass air passages. In alternative embodiments, the present disclosure may include bypass air conduits and exhaust gas passages disposed in the alternating manner described herein.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc. The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. An aircraft propulsion system, comprising:
   a turbine engine configured to exhaust gases during combustion, the exhaust gases including water vapor; and
   an exhaust gas condenser that extends lengthwise along a central axis, the exhaust gas condenser including:
      a housing extending lengthwise between a forward end and an aft end, the housing having an interior cavity, a top side, a bottom side opposite the top side, a first lateral side, and a second lateral side opposite the first lateral side, wherein the first lateral side and the second lateral side both extend between the top side and the bottom side;
      a nozzle in communication with the housing and disposed at the aft end;
      a plurality of air scoops attached to the housing and open to ambient air; and
      a plurality of exhaust gas conduit banks disposed in the interior cavity of the housing, wherein the exhaust gas conduit banks are configured to form an interior bypass air chamber within the housing interior cavity, and wherein each said exhaust gas conduit bank includes a plurality of exhaust gas conduits and a plurality of bypass air passages, wherein the exhaust gas conduits and the bypass air passages are disposed relative to one another in an alternating configuration;
   wherein the exhaust gas conduits extend axially between the forward end and the aft end, and the exhaust gas conduits are open at the forward end to receive the exhaust gases from the turbine engine and open at the nozzle; and
   wherein the bypass air passages are configured to receive bypass air from the plurality of air scoops and direct the bypass air between the exhaust gas conduits and into the interior bypass air chamber, and the interior bypass air chamber is in fluid communication with the nozzle.

2. The aircraft propulsion system of claim 1, wherein the exhaust gas condenser is configured to keep the exhaust gases separate from the bypass air.

3. The aircraft propulsion system of claim 2, wherein the nozzle includes an exhaust gas portion and a bypass air portion;
   wherein the exhaust gas conduits are in communication with the exhaust gas portion of the nozzle and the exhaust gas nozzle portion is configured to maintain the exhaust gases separate from the bypass air; and
   wherein the interior bypass air chamber is in communication with the bypass air portion of the nozzle and the bypass air portion is configured to maintain the bypass air separate from the exhaust gases.

4. The aircraft propulsion system of claim 1, wherein the plurality of exhaust gas conduit banks includes a first lateral side bank of exhaust gas conduits disposed adjacent to the first lateral side of the housing, a second lateral side bank of exhaust gas conduits disposed adjacent to the second lateral side of the housing, and a bottom side bank of exhaust gas conduits disposed adjacent to the bottom side of the housing; and wherein the plurality of air scoops includes a first lateral side air scoop attached to the first lateral side of the housing, a second lateral side air scoop attached to the second lateral side of the housing, and a bottom side air scoop attached to the bottom side of the housing.

5. The aircraft propulsion system of claim 4, wherein the exhaust gas conduits within the first lateral side bank of exhaust gas conduits and the second lateral side bank of exhaust gas conduits are lateral side (LS) exhaust gas conduits and the bypass air passages disposed alternating with the LS exhaust gas conduits are LS bypass air passages; and wherein the LS exhaust gas conduits extend laterally; and wherein the LS bypass air passages of the first lateral side bank of exhaust gas conduits are configured to provide fluid communication between the first lateral side air scoop and the interior bypass air chamber, and the LS bypass air passages of the second lateral side bank of exhaust gas conduits are configured to provide fluid communication between the second lateral side air scoop and the interior bypass air chamber.

6. The aircraft propulsion system of claim 5, wherein the exhaust gas conduits within the bottom side bank of exhaust gas conduits are bottom side (BS) exhaust gas conduits and the bypass air passages disposed alternating with the BS exhaust gas conduits are BS bypass air passages; and wherein the BS exhaust gas conduits extend heightwise; and wherein the BS bypass air passages of the bottom side bank of exhaust gas conduits are configured to provide fluid communication between the bottom side air scoop and the interior bypass air chamber.

7. The aircraft propulsion system of claim 6, wherein the exhaust gas condenser further comprises:

a first collection channel disposed at a first interface between the first lateral side bank of exhaust gas conduits and the bottom side bank of exhaust gas conduits, wherein the first collection channel is configured to receive bypass air from at least some of the LS bypass air passages within the first lateral side bank of exhaust gas conduits and direct the bypass air to the interior bypass air chamber; and a second collection channel disposed at a second interface between the second lateral side bank of exhaust gas conduits and the bottom side bank of exhaust gas conduits, wherein the second collection channel is configured to receive bypass air from at least some of the LS bypass air passages within the second lateral side bank of exhaust gas conduits and direct the bypass air to the interior bypass air chamber.

8. The aircraft propulsion system of claim 7, wherein a flow area of the interior bypass chamber increases in the axial direction from the forward end to the aft end.

9. The aircraft propulsion system of claim 4, wherein the housing has a length, a width, and a height; and wherein the first lateral side air scoop and the second lateral side air scoop each has an opening disposed at the forward end, and wherein each of the first lateral side air scoop and the second lateral side air scoop tapers inwardly in a direction from the forward end to the aft end.

10. The aircraft propulsion system of claim 9, wherein the first lateral side air scoop and the second lateral side air scoop extend the length of the housing.

11. The aircraft propulsion system of claim 10, wherein the first lateral side air scoop and the second lateral side air scoop extend the height of the housing.

12. The aircraft propulsion system of claim 4, wherein the housing has a length, a width, and a height; and wherein the bottom side air scoop has an opening disposed at the forward end, and wherein the bottom side air scoop tapers inwardly in a direction from the forward end to the aft end.

13. The aircraft propulsion system of claim 12, wherein the bottom side air scoop extends the length of the housing.

14. The aircraft propulsion system of claim 13, wherein the bottom side air scoop extends the width of the housing.

15. The aircraft propulsion system of claim 1, wherein a flow area of the interior bypass chamber increases in the axial direction from the forward end to the aft end.

16. The aircraft propulsion system of claim 1, further comprising a water recovery system in communication with the exhaust gas condenser, the water recovery system configured to recover liquid water from the exhaust gas condenser.

17. An exhaust gas condenser for an aircraft turbine engine, the exhaust gas condenser extending lengthwise along a central axis, comprising:

a housing configured to receive exhaust gases from an aircraft turbine engine, the housing extending lengthwise between a forward end and an aft end, the housing having an interior cavity, a top side, a bottom side opposite the top side, a first lateral side, and a second lateral side opposite the first lateral side, wherein the first lateral side and the second lateral side both extend between the top side and the bottom side;

a nozzle in communication with the housing and disposed at the aft end;

a plurality of air scoops attached to the housing and open to ambient air; and a plurality of exhaust gas conduit banks disposed in the interior cavity of the housing, wherein the exhaust gas conduit banks are configured to form an interior bypass air chamber within the housing interior cavity, and wherein each said exhaust gas conduit bank includes a plurality of exhaust gas conduits and a plurality of bypass air passages, wherein the exhaust gas conduits and the bypass air passages are disposed relative to one another in an alternating configuration;

wherein the exhaust gas conduits extend axially between the forward end and the aft end, and the exhaust gas conduits are open at the forward end to receive the exhaust gases from the turbine engine and open at the nozzle; and wherein the bypass air passages are configured to receive bypass air from the plurality of air scoops and direct the bypass air between the exhaust gas conduits and into the interior bypass air chamber, and the interior bypass air chamber is in fluid communication with the nozzle.

18. The exhaust gas condenser of claim 17, wherein the plurality of exhaust gas conduit banks includes a first lateral side bank of exhaust gas conduits disposed adjacent to the first lateral side of the housing, a second lateral side bank of exhaust gas conduits disposed adjacent to the second lateral side of the housing, and a bottom side bank of exhaust gas conduits disposed adjacent to the bottom side of the housing; and wherein the plurality of air scoops includes a first lateral side air scoop attached to the first lateral side of the housing, a second lateral side air scoop attached to the second lateral side of the housing, and a bottom side air scoop attached to the bottom side of the housing.

19. The exhaust gas condenser of claim 18, wherein the exhaust gas conduits within the first lateral side bank of exhaust gas conduits and the second lateral side bank of exhaust gas conduits are lateral side (LS) exhaust gas conduits and the bypass air passages disposed alternating with the LS exhaust gas conduits are LS bypass air passages; and wherein the LS exhaust gas conduits extend laterally; and wherein the LS bypass air passages of the first lateral side bank of exhaust gas conduits are configured to provide fluid communication between the first lateral side air scoop and the interior bypass air chamber, and the LS bypass air passages of the second lateral side bank of exhaust gas conduits are configured to provide fluid communication between the second lateral side air scoop and the interior bypass air chamber; and wherein the exhaust gas conduits within the bottom side bank of exhaust gas conduits are bottom side (BS) exhaust gas conduits and the bypass air passages disposed alternating with the BS exhaust gas conduits are BS bypass air passages; and wherein the BS exhaust gas conduits extend heightwise; and wherein the BS bypass air passages of the bottom side bank of exhaust gas conduits are configured to provide fluid communication between the bottom side air scoop and the interior bypass air chamber.

\* \* \* \* \*